United States Patent Office 3,700,660
Patented Oct. 24, 1972

3,700,660
CATALYTIC PREPARATION OF 17α-ACYLOXY-20-KETO-STEROIDS
Gerhard Hempel, Bergkamen, Reinhold Wieske, Berlin, Bernhard Krieger, Bergkamen, and Emanuel Kaspar, Kamen, Germany, assignors to Schering AG, Berlin, Germany
No Drawing. Filed Oct. 1, 1969, Ser. No. 862,946
Claims priority, application Germany, Oct. 2, 1968, P 18 01 389.3; July 31, 1969, P 19 39 507.4
Int. Cl. C07c 173/00
U.S. Cl. 260—239.55                    12 Claims

ABSTRACT OF THE DISCLOSURE

A process for the preparation of a 17α-acyloxy-20-keto-steroid of the pregnane or 19-norpregnane series, said process comprising the step of catalytically converting the corresponding 20-acyloxy-17α,20-epoxy-steroid with a catalytically effective amount of a concentrated strong acid such as perchloric acid, $H_2SO_4$, $BF_3$, HCl, p-toluene sulfonic acid and the like. The final products have the known activities associated with steroids of the pregnane and 19-nor-pregnane series, e.g., progestational, anti-inflammatory, etc.

BACKGROUND OF THE INVENTION

This invention relates to the preparation of 17α-acyloxy-20-keto-steroids of the pregnane and 19-norpregnane series.

It is known that 3β,20-diacetoxy-17α,20-epoxy-5α-pregnane can be rearranged by thermal treatment, under isomerization, into 3β,17-diacetoxy-5α,17α-pregnan-20-one, the disadvantage being that the acetyl side chain (20, 21) is changed to the unnatural α-configuration. However, according to the process of this invention, the 20-acyloxy-17α,20-epoxy group is rearranged into a 17α-acyloxy-20-oxo group, with the natural β-configuration of the acetyl side chain being preserved. It is also known that it is possible to treat 20-acyloxy-17,20-epoxy-steroids with dilute hydrochloric acid to obtain the corresponding 17α-hydroxy-steroids. Thereafter, a separate esterification can be conducted to obtain the corresponding 17α-acyloxy-steroids.

SUMMARY OF THE INVENTION

A principal object of this invention is to provide a novel improved process for the production of 17α-acyloxy-20-keto-steroids.

Another object is to provide novel steroids as well as methods of administration and pharmaceutical compositions based thereon.

Upon further study of the specification and claims, other objects and advantages of the present invention will become apparent.

To attain these objects, 20-acyloxy-17α,20-epoxy-steroids of the pregnane and 19-norpregnane series are treated with a concentrated acid.

With the process of this invention, the corresponding 17α-acyloxy-20-oxo-steroids are produced from 20-acyloxy-17α,20-epoxy-steroids by acyl migration, with the epoxy ring being split. Thus, it is possible to proceed directly from 20-acyloxy-17α,20-epoxy-steroids to 17α-acyloxy-20-keto-steroids, without the necessity of subsequently esterifying the 17α-hydroxy group, formed during an acidic hydrolysis with dilute acids, after the epoxy splitting reaction.

DETAILED DISCUSSION OF THE INVENTION

For the invention, all concentrated strong organic and inorganic acids are generally suitable, e.g., polyhalogenated carboxylic acids such as trihaloacetic acid and homologs thereof, organosulfonic acids such as p-toluenesulfonic acid, cation exchange resins such as those based on sulfonated styrene, mineral acids such as hydrochloric acid, sulfuric acid and perchloric acid, and Lewis acids, such as aluminum trichloride or boron trifluoride etherate. By the term "concentrated strong acid" is meant Broenstedt acids (proton donators) at high concentration before adding to the reaction mixture with a degree of ionization more than 40% and Lewis acids (electron acceptors) usually taken in laboratory practice.

It is advantageous in some cases to conduct the rearrangement of the 20-acyl to the 17-acyl group in the additional presence of an acid anhydride corresponding to the desired acyloxy group to be attached to the 17α-position. For example, to obtain 17α-acetoxy steroids, the reaction is beneficially conducted in the presence of acetic anhydride. Generally, the acid anhydride in an excess of 2–5 moles compared to the starting material and increases the yield of the 17α-acyloxy-20-keto-steroids.

To conduct the rearrangement in a homogeneous phase, it is advantageous to operate in a solvent. Suitable solvents are all those solvents which are inert to strong acids. Examples for such solvents include but are not limited to halogenated hydrocarbons, such as methylene chloride and carbon tetrachloride; aromatic hydrocarbons, such as benzene; and carboxylic acids and the anhydrides thereof, such as acetic acid or acetic anhydride and homologs thereof. It is also possible to employ mixtures of solvents. The strong acid added to the reaction mixture serves as the reaction catalyst. Consequently, only a catalytically effective amount must be added, preferably only on the order of 0.01–0.2 mole concentrated strong acid per 1 mole steroid.

The rearrangement takes place at a temperature from 0° C. up to the boiling point of the solvent, usually not higher than about 150° C., preferably at about room temperature, e.g., 15–35° C. Advantageously, the reaction time is about ½ to 48, preferably 2 to 24 hours, lower temperatures requiring longer times but resulting in higher yields.

The steroid residue of the starting compounds employed according to the invention can contain all those moieties conventional to steroid compounds. Examples include but are not limited to: free, esterified or etherified hydroxy groups, for example in the 3-, 11-, 16- and/or 21-position; free or functionally modified keto groups, for example in the 3- and/or 6-position, preferably lower alkyl groups, for example in the 1-, 7-, 16- and/or 18-position; halogen atoms, for example in the 2-, 4-, 6-, 7-, 9-, 16- and/or 21-position. Furthermore, the molecule in rings A, B, C and/or D can be saturated or unsaturated, for example, in the 1-, 3-, 4-, 5(6)-, 5(10)-, 6-, 9(11)- and/or 14(15)-position. A hydrogen which can be present in the 5-position may exhibit a 5α- or a 5β-configuration.

Thus, the important aspect of the pregnane or 19-norpregnane starting material is that it has the following D ring structure:

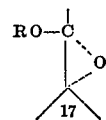

wherein R is acyl, preferably derived from a carboxylic acid of 1–12 carbon atoms, representative examples of R including but not limited to acetyl, hexanoyl, benzoyl, formyl, propionyl, butyryl, valeryl, oenanthyl, undecylenyl, cyclohexyl carboxyl or adamantane carboxyl.

Many of the starting compounds employed in this invention are already known and their preparation described, reference being invited to J. Am. Chem. Soc. 73 (1951) 184.

As for the other starting materials, the 20-acyloxy-17α,20-epoxy group is produced in a conventional manner from corresponding 17α-desoxy-20-keto steroids, for example by enolization of the 20-keto group with carboxylic anhydride in the presence of an acidic catalyst, such as. for example, perchloric acid, and subsequent epoxidation of the simultaneously produced 17,20-double bond by means of organic peracids, such as, for example, peracetic acid. If the products of the process are to contain additionally an alkyl group in the 16-position, the 16-alkyl group and the 20-acyloxy-17α,20-epoxy group are suitably introduced one directly after the other. In this connection, a suitable starting substance is a corresponding Δ16-20-keto-steriod which is treated in the conventional manner with alkyl magnesium halides in the presence of copper (I) chloride, whereupon the thus-obtained 16α-alkyl-Δ17(20)-20-metal enolate is decomposed with acylating agents, likewise in a conventional manner, for example with acyl chloride in tetrahydrofuran, and then the Δ17(20)-double bond is epoxidized with an organic peracid.

Specific examples of starting materials other than those mentioned in the working examples include but are not limited to 20-acyloxy-17α,20-epoxy-4-pregnen-3-one,
20-acyloxy-17α,20-epoxy-19-nor-4-pregnen-3-one,
6ξ-hydroxy-20-acyloxy-17α,20-epoxy-4-pregnen-3-one,
3β-acetoxy-20-acyloxy-17α,20-epoxy-19-nor-5β-pregnane,
7α-chlor-3β-acetoxy-20-acyloxy-17α,20-epoxy-5β-pregnane,
3β,11-diacetoxy-20-acyloxy-17α,20-epoxy-5β-pregn-9(11)-ene,
4-chlor-3β-acetoxy-20-acyloxy-17α,20-epoxy-16α-methyl-4-pregnene,
6α-chlor-20-acyloxy-17α,20-epoxy-4-pregnen-3-one,
9α,11β-dichlor-3-acetoxy-20-acyloxy-17α,20-epoxy-5β-pregnane,
20-acyloxy-17α,20-epoxy-1-methyl-5β-pregn-1-en-3-one,
3β,11β,21-trihydroxy-20-acyloxy-17α,20-epoxy-5β-pregnane,
16α,21-dihydroxy-3-acetoxy-20-acyloxy-17α,20-epoxy-5β-pregnane,
21-acetoxy-20-acyloxy-17α,20-epoxy-4-pregnen-3-one,
11β,21-dihydroxy-20-acyloxy-17α,20-epoxy-4-pregnen-3-one,
11β,21-dihydroxy-20-acyloxy-17α,20-epoxy-1,4-pregnadien-3-one,
9α-fluor-11β,21-dihydroxy-20-acyloxy-17α,20-epoxy-16α-methyl-1,4-pregnadien-3-one,
6α-fluor-9α-chlor-11β-hydroxy-21-acetoxy-20-acyloxy-17α,20-epoxy-16α-methyl-1,4-pregnadien-3-one, and
6α-fluor-21-hydroxy-20-acyloxy-17α,20-epoxy-16α-methyl-1,4-pregnadien-3-one.

When conducting the process of this invention, care must be taken that free hydroxyl groups present in the starting compound can be acylated depending on the position of the hydroxyl groups on the steroid skeleton.

In certain cases, free keto groups in the starting substance, present, for example, as a 3-keto-Δ4 grouping, should be protected beforehand; otherwise these groups would be attacked under the reaction conditions employed, with the formation of enol acylates.

The final products produced by this invention correspond to the starting materials except that the 17α,20-epoxy group is eliminated, the 20-position is occupied by a keto group and the 17-carbon atom is substituted in the α-position by the same acyloxy group formerly attached to the 20-carbon atom, as follows:

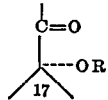

The final products of this invention exhibit diverse utilities. For example, those having an oxygen function at the 3-position and a 4,5-double bond exhibit progestational activity. An added oxygen function at the 11-position together with an added 21-hydroxyl group results in anti-inflammatory activity.

The novel final products of this invention and their respective utilities are as follows:

The final products of this ivention can be used as intermediates for the preparation, e.g. of strong gestagenes. Thus, the new 3β-acetoxy-17α-hexanoyl-5β-pregnan-20-one is especially suitable for the preparation of the caproate of 17α-hydroxy progesterone as shown for example in U.S.P. 2,753,360. Hereto, the 3β-acetoxy-17α-hexanoyl-5β-pregnan-20-one is partially saponified to the 3β-hydroxy compounds, oxidized for example with Jones reagent and the obtained 3-keto steroid is dehydrogenated in the 4,5-position either chemically or microbiologically to the caproate of 17α-hydroxy progesterone, which is sold commercially under the designation "Proluton®-Depot." Furthermore, the new 3β,17α-diacetoxy-16α-methyl-5β-pregnan-20-one is suitable for the preparation of 17α-acetoxy-16α-methyl-progesterone (U.S.P. 3,019,-219) by introduction of the 3-keto-Δ4-grouping as described above.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

0.7 g. of 3β,20-diacetoxy-17α,20-epoxy-5β-pregnane is dissolved in 15 ml. of methylene chloride and mixed with 0.01 ml. of 70% perchloric acid. After agitating the reaction mixture for 4 hours at room temperature, the mixture is washed to neutral with water and a solution of sodium bicarbonate, dried with sodium sulfate, and concentrated to dryness under vacuum. After purification by means of preparative thin-layer chromatography (3×8:2 cyclohexane/ethyl acetate), there is obtained 365 mg. of 3β,17α-diacetoxy-5β-pregnan-20-one. After recrystallization from isopropyl ether, the melting point of the compound is 174–176° C.

EXAMPLE 2

Two grams of 3β-acetoxy-20-hexanoyloxy-17α,20-epoxy-5β-pregnane is dissolved in 25 ml. of carbon tetrachloride and stirred with 0.02 ml. of 70% perchloric acid for 3 hours at room temperature. Thereafter, the reaction mixture is washed to neutral with water and a solution of sodium bicarbonate, dried with sodium sulfate, and concentrated to dryness under vacuum. The crude product exhibits a melting point of 119–122° C. and after chromatography (3×8:2 cyclohexane/ethyl acetate), thus obtaining 1.68 g. of 3β-acetoxy-17α-hexanoyloxy-5β-pregnan-20-one. After recrystallization, this reaction product is purified by means of preparative thin-layer further purification a melting point of 124–125° C.

EXAMPLE 3

Five grams of 3β-acetoxy-5β-pregnan-20-one is dissolved in 45 ml. of carbon tetrachloride, mixed with 17.92 g. of benzoic anhydride and 0.05 ml. of perchloric acid, and agitated for 4 hours at room temperature. Thereafter, the reaction mixture is washed to neutral with water and a solution of sodium carbonate; the organic phase is concentrated to dryness under vacuum, taken up in pyridine and water, and allowed to stand for 18 hours at room temperature. After being extracted by methylene chloride and neutralization of the pyridine with hydrochloric acid, the reaction mixture is washed to neutral with water and a sodium carbonate solution, dried with sodium sulfate, and concentrated to dryness under vacuum. The remaining residue is dissolved in 50 ml. of carbon tetrachloride, mixed with 0.55 g. of ground sodium acetate and 10.4 ml. of 30% peracetic acid, and stirred for 4 hours at room temperature. Thereafter, the reaction solution is washed to neutral with a sodium thiosulfate solution and water, dried with sodium sulfate, and concentrated to dryness under vacuum, thus obtaining 7.2 g. of an oily 3β-acetoxy-20-benzoyloxy-17α,20-epoxy-pregnane. Three grams of the epoxide is dissolved in 25 ml. of carbon tetrachloride, mixed with 0.03 ml. of 70% perchloric acid, and stirred for 4 hours at room temperature; then, the reaction mixture is worked up as set forth in Example 2. The crude product (3.2 g.) is purified by means of preparative thin-layer chromatography (3×8:2 cyclohexane/ethyl acetate). The melting point of the thus-purified 3β-acetoxy-17α-benzoyloxy-5β-pregnan-20-one, recrystallized from isopropyl ether, is 206–207.5° C.

$[α]_D^{20} = -15°$ (chloroform).

EXAMPLE 4

Ten g. of 3β-acetoxy-5β-pregn-16-en-20-one is subjected to a Grignard reaction with methyl magnesium bromide in tetrahydrofuran in the presence of copper (I) chloride and subsequent acetylation with acetyl chloride in tetrahydrofuran, resulting in a product of oily 3β,20-diacetoxy-16α-methyl-5β-pregn-17(20)-ene. This enol diacetate is epoxidized with m-chloroperbenzoic acid in methylene chloride to yield 3β,20-diacetoxy-17α,20-epoxy-16α-methyl-5β-pregnane.

12.2 g. of the crude epoxide is dissolved in 60 ml. of methylene chloride, mixed with 0.12 ml. of 70% perchloric acid and stirred for 2 hours at room temperature. The methylene chloride solution is washed to neutral with water and concentrated to dryness. The crude product (12.1 g.) is purified by preparative thin-layer chromatography (2:1 cyclohexane/ether). After recrystallization from methanol, there is obtained 3β,17α-diacetoxy-16α-methyl-5β-pregnan-20-one, M.P. 198–200° C.;

$[α]_D^{20} = +18.5°$ chloroform)

EXAMPLE 5

Two grams of 3β,20-diacetoxy-17α,20-epoxy-5β-pregnane is dissolved in 30 ml. of methylene chloride and mixed with 0.02 ml. of concentrated sulfuric acid. After being stirred for 24 hours at room temperature, the reaction mixture is washed neutral with water and sodium bicarbonate solution, dried with sodium sulfate, and concentrated to dryness under vacuum. After purification by preparative thin-layer chromatography (3×8:2 cyclohexane/ethyl acetate), there is obtained 318 mg. of 3β,17α-diacetoxy-5β-pregnan-20-one. The melting point of this reaction product, after recrystallization from isopropyl ether, is 174–176° C.

EXAMPLE 6

Analogously to Example 1, 700 mg. of 3β,20-diacetoxy-17α,20-epoxy-5β-pregnane is mixed with 0.02 ml. of 70% sulfuric acid, thus obtaining 181 mg. of 3β,17α-diacetoxy-5β-pregnan-20-one. Recrystallized from isopropyl ether, its melting point is 174–176° C.

EXAMPLE 7

Two grams of 3β,20-diacetoxy-17α,20-epoxy-5β-pregnane is dissolved in 30 ml. of methylene chloride and mixed with 0.02 ml. of freshly distilled boron trifluoride etherate. After 24 hours of agitation at room temperature, the reaction mixture is worked up as in Example 1. After purification by preparative thin-layer chromatography (3×8:2 cyclohexane/ethyl acetate), there is obtained 177 mg. of 3β,17α-diacetoxy-5β-pregnan-20-one. After recrystallization from isopropyl ether, its melting point is 174–176° C.

EXAMPLE 8

A vigorous stream of dry hydrogen chloride gas is passed for 0.5 minute through a solution of 2 g. of 3β,20-diacetoxy-17α,20-epoxy-5β-pregnane in 30 ml. of methylene chloride. After agitation for 24 hours at room temperature, the reaction mixture is worked up as described in Example 1. After purification by preparative thin-layer chromatography, there is obtained 608 mg. of 3β,17α-diacetoxy-5β-pregnan-20-one. After being recrystallized from isopropyl ether, its M.P. is 174–176° C.

EXAMPLE 9

During a period of 2 hours, a solution of 1.1 ml. of methyl iodide in 20 ml. of ether is added dropwise to 0.40 g. of magnesium filings in 5 ml. of absolute ether. To ensure complete dissolution, the reaction mixture is agitated for one-half hour. Then, 50 ml. of tetrahydrofuran is added; 35 ml. of ether/tetrahydrofuran mixture is distilled off, and, after cooling to 20° C., there is added 0.1 g. of coper (I) chloride. To this reaction mixture, there is added 3.68 g. of 3β-acetoxy-5β-16-pregnen-20-one in 20 ml. of tetrahydrofuran, and the mixture is stirred for 1 hour.

Thereafter, the reaction mixture is mixed with 1.1 ml. of acetyl chloride in 10 ml. of tetrahydrofuran, agitated for 1 hour at room temperature, and then stirred into 700 ml. of an aqueous ammonium chloride solution. The thus-precipitated oily product is taken up in methylene chloride; the organic phase is washed with a 10% solution of sodium sulfate and twice with water, dried with sodium sulfate, and concentrated to dryness under a vacuum, thus obtaining 5.2 g. of oily 3β,20-diacetoxy-16α-methyl-5β-pregn-17(20)-ene.

This enol acetate is dissolved in 30 ml. of carbon tetrachloride, mixed while being agitated with 0.41 g. of ground sodium acetate and 5.8 ml. of 40% peracetic acid, and agitated for an additional 4 hours at room temperature. Thereafter, the carbon tetrachloride solution is washed to neutral with a 10% solution of sodium thiosulfate and water, dried after filtration with sodium sulfate, and evaporated to dryness under vacuum, thus obtaining 4.6 g. of oily 3β,20-diacetoxy-17α,20-epoxy-16α-methyl-5β-pregnane.

The crude 3β,20-diacetoxy-17α,20-epoxy-16α-methyl-5β-pregnane is dissolved in 23 ml. of methylene chloride and heated under reflux for 4 hours in the presence of 2.75 ml. of acetic anhydride and 0.69 g. of p-toluenesulfonic acid. After cooling to 20° C., 3.22 ml. of methanol/water (1:1) is allowed to flow gradually into the reaction mixture, and the mixture is stirred for 30 minutes. Thereafter, the methylene chloride solution is washed to neutral with a dilute sodium bicarbonate solution and water; the organic phase is dried with sodium sulfate, and evaporated under vacuum. The crude product is recrystallized from methanol, thereby obtaining 3.05 g. of 3β,17α-diacetoxy-16α-methyl-5β-pregnan-20-one, M.P. 200–202° C.

$[α]_D = +19.2°$ (chloroform).

EXAMPLE 10

Ten grams of oily 3β,20-diacetoxy-17α,20-epoxy-16α-methyl-5β-pregnane is dissolved in 50 ml. of methylene chloride, mixed with 15 ml. of acetic anhydride and 0.1 ml. of 70% perchloric acid and stirred for 2 hours at room temperature. Thereafter, the methylene chloride solution is washed to neutral with water, concentrated to dryness, and the residue is recrystallized from methanol, thus obtaining 7.1 g. of 3β,17α-diacetoxy-16α-methyl-5β-pregnan-20-one, M.P. 198–202° C. $[α]_D = +19.4°$ (chloroform).

EXAMPLE 11

By replacing the four hours of heating in Example 9 by 16 hours of reaction at room temperature, there is obtained 7.5 g. of 3β,17α-diacetoxy-16α-methyl-5β-pregnan-20-one from ten gr. of 3β,20-diacetoxy-17α,20-epoxy-16α-methyl-5β-pregnane.

EXAMPLE 12

Ten grams of oily 3β,20-diacetoxy-17α,20-epoxy-16α-methyl-5β-pregnane is dissolved, under heating, in 100 ml. of glacial acetic acid, mixed with 12 ml. of acetic anhydride and 1.5 g. of p-toluene-sulfonic acid, and heated for 4 hours to 40–42° C. Thereafter, the reaction mixture is cooled, precipitated in ice water, and the thus-produced precipitate is vacuum-filtered and washed to neutral. After recrystallization of the crude product, there is obtained 7.35 g. of 3β,17α-diacetoxy-16α-methyl-5β-pregnan-20-one, M.P. 197–200° C.; $[\alpha]_D = +18.0°$ (chloroform).

EXAMPLE 13

Ten grams of oily 3β,20-diacetoxy-17α,20-epoxy-16β-methyl-5α-pregnane is stirred for 2 hours at room temperature in a mixture of 50 ml. of methylene chloride, 15 ml. of acetic anhydride and 0.1 ml. of 70% perchloric acid, and worked up analogously to Example 10. There is then produced 7.4 g. of 3β,17α-diacetoxy-16β-methyl-5α-pregnan-20-one, M.P. 161–162° C.

EXAMPLE 14

Ten grams of 3β,20-diacetoxy-17α,20-epoxy-5β - pregnane is stirred at room temperature for 20 minutes in a mixture of 70 ml. of carbon tetrachloride, 15 ml. of acetic anhydride and 0.1 ml. of 70% perchloric acid. Then, the reaction mixture is mixed with water, stirred, and the organic phase is washed to neutral. After concentration to dryness, the reaction product is recrystallized from isopropyl ether, thus obtaining 7.2 g. of 3β,17α-diacetoxy-5β-pregnan-29-one, M.P. 175–176° C.; $[\alpha]_D = +3.0°$ (ethanol).

EXAMPLE 15

Two grams of 3β-acetoxy-5β-pregnan-20-one is stirred in 17 ml. of carbon tetrachloride, 3.4 ml. of caproic anhydride and 0.02 ml. of 70% perchloric acid for 2 hours at room temperature. Thereafter, the reaction mixture is stirred with water, washed with a solution of soidum bicarbonate and water, and dried with sodium sulfate and filtered.

The carbon tetrachloride solution containing the 3β-acetoxy-20-hexanoyloxy-5β-pregn-17(20) - ene is mixed with 0.22 g. of ground sodium acetate and 3.1 ml. of 40% peracetic acid and stirred for 4 hours at room temperature. The reaction solution is then washed with a sodium sulfite solution and water and concentrated to dryness under vacuum.

The thus-obtained oily 3β-acetoxy-20-hexanoyloxy-17α, 20-epoxy-5β-pregnane is stirred in a mixture of 10 ml. of methylene chloride, 3.4 ml. of caproic anhydride and 0.02 ml. of 70% perchloric acid for 30 minutes at room temperature. Then, the methylene chloride solution is washed to neutral with a dilute sodium hydroxide solution and water, dried with sodium sulfate, filtered, and concentrated to dryness under vacuum, The crude product is purified by preparative thin-layer chromatography (cyclohexane/ethyl acetate 7:3), thus obtaining 1.3 g. of 3β-acetoxy-17α-capronyloxy-5β-pregnan-20-one in the form of an oil, which solidifies after standing; M.P. 125–126° C.

*Analysis.*—Calculated (percent): C, 73.4; H, 9.6; O, 16.9. Found (percent): C, 73.2; H, 9.9; O, 16.5.

EXAMPLE 16

Ten grams of 3β,20-diacetoxy-17α,20-epoxy-5α-pregnane is reacted in a mixture of 70 ml. of carbon tetrachloride, 15 ml. of acetic anhydride and 0.1 ml. of 70% perchloric acid analogously to Example 14, thus obtaining 7.15 g. of 3β,17α-diacetoxy-5α-pregnan-20-one, M.P. 198–199° C.; $[\alpha]_D = -9.3°$ (dioxane).

EXAMPLE 17

Nine grams of 3α,11β-diacetoxy-5β-pregnan-20-one is mixed, in 80 ml. of carbon tetrachloride, with 14 ml. of acetic anhydride and 0.1 ml. of 70% perchloric acid, and stirred for 2 hours at room temperature. Thereafter, the reaction solution is washed to neutral with a solution of sodium bicarbonate and water, and dried with sodium sulfate.

After filtration, the thus-obtained enol acetate solution is mixed with 1 g. of ground sodium acetate and 15 ml. of 40% peracetic acid and stirred for 4 hours at room temperature. Thereafter, the reaction mixture is washed with a sodium sulfite solution and water, and the organic phase is evaporated to dryness under vacuum.

The remaining oily 3α,11β,20-triacetoxy-17α,20-epoxy-5β-pregnane is taken up in 70 ml. of carbon tetrachloride and treated analogously to Example 14 with 15 ml. of acetic anhydride and 0.1 ml. of 70% perchloric acid, thus obtaining 7.1 g. of 3α,11β,17α-triacetoxy-5β-pregnan-20-one, M.P. 209–210° C.; $[\alpha]_D = +54.3°$ (chloroform).

EXAMPLE 18

Nine grams of 3β,21-diacetoxy-5α-pregnan-20-one is converted into the epoxide by way of the enol acetate, analogously to Example 17, thereby obtaining 10.2 g. of 3β,20,21-triacetoxy-17α,20-epoxy-5α-pregnane as an oil.

Ten grams of 3β,20,21-triacetoxy - 17α,20 - epoxy-5α-pregnane is reacted in a mixture of 70 ml. of carbon tetrachloride, 15 ml. of acetic anhydride and 0.1 ml. of 70% perchloric acid analogously to Example 14, thus obtaining 7.0 g. of 3β,17α,21-triacetoxy-5α-pregnan-20-one, M.P. 204–205.5° C.

EXAMPLE 19

One gram of 3-methoxy-20-acetoxy-17α,20-epoxy-19-nor-1,3,5(10)-pregnatriene is reacted in a mixture of 7 ml. of benzene, 1.5 ml. of acetic anhydride and 0.01 ml. of 70% perchloric acid analogously to Example 14, thus obtaining 0.69 g. of 3-methoxy-17α-acetoxy-19-nor-1,3,5-(10)-pregnatriene-20-one, M.P. 193–194° C.;

$$[\alpha]_D = +43.10°$$

(chloroform).

EXAMPLE 20

One gram of 3,20-diacetoxy-17α,20-epoxy-19-nor-1,3,5(10)-pregnatriene is dissolved in 7 ml. of carbon tetrachloride and treated with 1.5 ml. of acetic anhydride and 0.01 ml. of 70% perchloric acid analogously to Example 14, thus obtaining 0.7 g. of 3,17α-diacetoxy-19-nor-1,3,5(10)-pregnatrien-20-one, M.P. 194–195° C.;

$$[\alpha]_D = +34°$$

(chloroform).

EXAMPLE 21

Ten grams of (20-acetoxy-17α,20-epoxy-4-pregnen-3-ylidene)-N-pyrrolidinium perchlorate is stirred for 1 hour at room temperature in a mixture of 85 ml. of benzene, 15 ml. of acetic anhydride and 0.1 ml. of 70% perchloric acid. Thereafter, 10 ml. of methanol is allowed to flow gradually into the reaction mixture; the resultant mixture is stirred for 30 minutes, and then mixed with 0.2 N aqueous-methanolic sodium hydroxide solution in a small excess; then, the reaction mixture is stirred for another 30 minutes at room temperature. The solution is neutralized with acetic acid, washed with water, and the organic phase is concentrated by evaporation under vacuum. The thus-obtained 17α-acetoxy-4-pregnene-3,20-dione is recrystallized from ethyl acetate; M.P. 238.5–240° C.

EXAMPLE 22

A Grignard solution is prepared by introducing methyl bromide into 1.7 g. of magnesium filings in 160 ml. of tetrahydrofuran. The tetrahyrofuran (80 ml.) is distilled off, and the reaction mixture is cooled to 15° C.; then there is added 0.28 g. of copper(I) chloride. Immediately thereafter, a solution of 10 g. of 3β-acetoxy-5β,16-pregnen-20-one in 70 ml. of tetrahydrofuran is allowed to flow into the reaction mixture at 30° C., and stirring is continued for 1 hour at 30° C.

Then, the reaction mixture is cooled to 0° C. and, at 0–5° C., a solution of 6.8 ml. of benzoyl chloride in 40 ml. of tetrahydrofuran is added dropwise. The reaction mixture is stirred for 1 hour at 0° C. and then decomposed with a solution of 14.2 g. of ammonium chloride in 40 ml. of water; stirring is then resumed for 30 minutes and the mixture distilled with steam. The residue is taken up in methylene chloride and washed to neutral with a saturated ammonium chloride solution and with water. After filtering over anhydrous sodium sulfate, the mixture is concentrated to dryness under vacuum, thus obtaining 13.54 g. of oily 3β-acetoxy-20-benzoyloxy-16α-methyl-5β-pregn-17(20)-ene as an isomeric mixture.

This 20-benzoyloxy compound (12.9 g.) is dissolved in 154 ml. of methylene chloride, and then there is introduced at 20° C. 8.6 g. of m-chloroperbenzoic acid (80%). The reaction mixture is agitated for 16 hours at room temperature and the excess of peracid is destroyed by the addition of 8 ml. of 20% sodium sulfite solution. Approximately 75 ml. of methylene chloride is distilled off; the residue is cooled to 0° C., and the thus-precipitated m-chlorobenzoic acid is vacuum-filtered. The filtrate is washed with dilute solutions of sodium bicarbonate and sodium bisulfite and a saturated solution of sodium chloride and thereafter with water. The organic phase is filtered over anhydrous sodium sulfate and concentrated to dryness under vacuum, yielding 13.6 g. of oily 3β-acetoxy-20-benzoyloxy-17,20-epoxy - 16α - methyl - 5β- pregnane.

A solution of 10 g. of crude 3β-acetoxy-20-benzoyloxy-17,20 - epoxy - 16α - methyl - 5β - pregnane in 50 ml. of methylene chloride is mixed with 14.4 g. of benzoic anhydride and 1.5 g. of p-toluene-sulfonic acid and heated under reflux for 4 hours. After cooling to 20° C., 15 ml. of methanol/water (1:1) is gradually added, and stirring is conducted for 30 minutes. The reaction mixture is washed to neutral with a dilute solution of sodium bicarbonate and water and distilled with steam. The residue is taken up in methylene chloride and once more washed with a dilute solution of sodium bicarbonate and water. The organic phase is filtered over anhydrous sodium sulfate and evaporated to dryness under vacuum. The residue is separated by preparative thin-layer chromatography (cyclohexane/ether 2:1), thus obtaining 3.5 g. of 3β - acetoxy - 17α - benzoyloxy - 16α - methyl - 5β-pregnan-20-one.

UV: $\epsilon_{229}=14,050$; $\epsilon_{272}=910$; $\epsilon_{280}=720$.

EXAMPLE 23

By reacting 3β - acetoxy - 20 - benzoyloxy - 17,20-epoxy - 16α - methyl - 5β - pregnane obtained according to Example 22, instead of with benzoic anhydride, with the equivalent amount of acetic anhydride, there are obtained, after preparative thin-layer chromatography, 3.4 g. of 3β,17α - diacetoxy - 16α - methyl - 5β - pregnan-20-one and 3.75 g. of 3β - acetoxy - 17α - benzoyloxy-16α-methyl-5β-pregnan-20-one.

UV: $\epsilon_{229}=14,230$; $\epsilon_{272}=875$; $\epsilon_{280}=690$.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the preparation of a 17α-acyloxy-20-keto-steroid of the pregnane or 19-norpregnane series, which process comprises rearranging the corresponding 20-acyloxy-17α,20-epoxy steroid in a single step by treatment of said corresponding steroid with a catalytically effective amount of a strong concentrated acid, said acid being a Bronstead acid having a degree of ionization of more than 40%, or a Lewis acid, and being sufficiently cencentrated to effect said rearranging.

2. A process as defined by claim 1 wherein said strong concentrated acid is an aqueous at least about 70% by weight perchloric acid.

3. A process as defined by claim 1 wherein said strong concentrated acid is sulfuric acid of at least about 70% by weight concentration.

4. A process as defined by claim 1 wherein said strong concentrated acid is boron trifluoride.

5. A process as defined by claim 1 wherein said strong concentrated acid is HCl.

6. A process as defined by claim 1 wherein said strong concentrated acid is p-toluene sulfuric acid.

7. A process as defined by claim 1 wherein said step is conducted in the further presence of an anhydride of an acid corresponding to the acyloxy group attached to the 17α-position.

8. A process as defined by claim 1 wherein said steroid is of the pregnane series.

9. A process as defined by claim 1, wherein said concentrated strong acid is employed in an amount of 0.01–0.2 mole per mole of steroid.

10. A process as defined by claim 1, said rearrangement being conducted for about ½ to 48 hours at 0–150° C.

11. A process as defined by claim 1, said rearrangement being conducted for about 2 to 24 hours at 15–35° C.

12. A process as defined by claim 7, said anhydride being present in a ratio 2–5 moles per mol of said corresponding steroid.

References Cited

FOREIGN PATENTS 761,114  11/1956  Great Britain _____ 260—397.4

OTHER REFERENCES

Chemical Abstracts, vol. 58 (1963), par. 4782q relied on.

ELBERT L. ROBERTS, Primary Examiner

U.S. Cl. X.R.

260—397.4, 397.45, 397.47, 397.5